United States Patent [19]
Takimoto et al.

[11] Patent Number: 5,868,423
[45] Date of Patent: Feb. 9, 1999

[54] AIR BAG SYSTEM

[75] Inventors: Masahiro Takimoto, Mie; Michihisa Asaoka, Aichi; Toshinori Takahashi, Aichi; Yasumasa Tatewaki, Aichi, all of Japan

[73] Assignee: Toyoda Gosei Co., Ltd., Aichi-ken, Japan

[21] Appl. No.: 941,076

[22] Filed: Sep. 30, 1997

[30] Foreign Application Priority Data

Sep. 30, 1996 [JP] Japan ................................. 8-259237

[51] Int. Cl.⁶ ................................................. B60R 21/32
[52] U.S. Cl. ............................................. 280/735; 701/45
[58] Field of Search ................................. 280/735, 736; 701/45; 340/436; 180/271, 274, 282

[56] References Cited

U.S. PATENT DOCUMENTS

| | | | |
|---|---|---|---|
| 5,407,228 | 4/1995 | Shibata et al. | 280/735 |
| 5,573,269 | 11/1996 | Gentry et al. | 280/735 |
| 5,670,853 | 9/1997 | Bauer | 280/735 X |
| 5,707,078 | 1/1998 | Swanberg et al. | 280/739 |

FOREIGN PATENT DOCUMENTS

94023974  10/1994  WIPO ................................. 280/235

*Primary Examiner*—Christopher P. Ellis
*Attorney, Agent, or Firm*—Pillsbury Madison & Sutro LLP

[57] ABSTRACT

In an air bag system according to the invention, there is employed a control device which can control the internal pressure of an air bag after expanded in such a manner that a buffer distance, for which the air bag after expanded can be compressed when it is contacted with an occupant, can be kept constant regardless of an increase or a decrease in the weight or the like of the occupant. In operation, the control device firstly takes out the acceleration data of the occupant corresponding to the degree of a collision in accordance with a signal from an acceleration sensor. Next, in accordance with the thus taken-out acceleration, a distance from the air bag before expanded to the head and bosom portion of the occupant obtained based on a signal from a distance sensor, and the weight of the occupant head and bosom portion obtained based on a signal from a weight sensor, the control device calculates a proper value of the internal pressure of the air bag according to a velocity/distance/power balancing condition equation, and controls a gas generation device in such a manner it can produce a generated gas pressure corresponding to the thus calculated proper value.

4 Claims, 6 Drawing Sheets

| CONDITIONS | STATES OF VEHICLE ROOM | ACCELERATION AND VELOCITY OF OCCUPANT |
|---|---|---|
| COLLISION TIME $t_0$ (WITH ROAD SURFACE AS YARDSTICK) |  | ACCELERATION=0<br>VELOCITY=$V_0$<br>= VEHICLE VELOCITY JUST BEFORE COLLISION<br>(ACCELERATION $a_0$ IS APPLIED BACKWARDLY TO VEHICLE BODY) |
| COLLISION TIME $t_0$ (WITH VEHICLE ROOM AS YARDSTICK) |  | ACCELERATION=$a_0$<br>VELOCITY=0 |
| TIME OF CONTACT WITH AIR BAG $t_2$ (WITH VEHICLE ROOM AS YARDSTICK) |  | ACCELERATION=$a_x$<br>$L_3 = \int_{t_0}^{t_2}\int a_x(t) d^2t$<br>VELOCITY $V_1 = \int_{t_0}^{t_2} a_x(t) dt$ |
| OCCUPANT RESTRAINT BY AIR BAG $t_2 \sim t_3$ (WITH VEHICLE ROOM AS YARDSTICK) |  | OCCUPANT HEAD AN BOSOM WEIGHT=$m$<br>ACCELERATION<br>$a_1(t) = a_x(t) - \dfrac{PS}{m}$ |
| OCCUPANT STOP $t_3$ (WITH VEHICLE ROOM AS YARDSTICK) |  | $L_m = V_1(t_3-t_2) - \int_{t_2}^{t_3}\int a_1(t)d^2t$<br>VELOCITY<br>$V_1 + \int_{t_2}^{t_3} a_1(t)dt = 0$ |

| KINDS \ STAGES | 1 | 2 | 3 | 4 | 5 | 6 | 7 |
|---|---|---|---|---|---|---|---|
| SMALL | ○ | | | ○ | ○ | | ○ |
| MEDIUM | | ○ | | ○ | | ○ | ○ |
| LARGE | | | ○ | | ○ | ○ | ○ |

(○ ··· GAS GENERATING DEVICES BEING IGNITED)

AIR BAG SYSTEM

BACKGROUND OF THE INVENTION

1. Field of the Invention

The present invention relates to an air bag system which is disposed in a vehicle and, in a vehicle collision, is used to restrain the head and bosom portion of an occupant with an air bag expanded and, in particular, to an air bag system which can adjust the internal pressure of the air bag to thereby expand the same according to the degree of the vehicle collision as well as according to the weight and sitting position of the occupant.

2. Description of the Related Art

Conventionally, as an air bag system which is used to restrain an occupant with an air bag expanded, there is known a system which adjusts the internal pressure of an air bag to thereby be able to expand the same according to the sitting position of the occupant, the degree of vehicle collision, and the like. In this type of air bag system, the degrees of collision, the sitting position of the occupant and the like are classified into stages according to predetermined boundary values, and the internal pressure of the air bag is adjusted according to the stages.

That is, there are set boundary values which are respectively used to check, for example, whether, as the sitting position of the occupant, a distance from the air bag folded to the occupant is less than 40 cm or not, or whether the acceleration in the collision is less than 70 Km/H or not, or whether the weight of the occupant is less than 50 Kg or not, or the like. And, the internal pressure of the air bag is adjusted in stages in accordance with whether the above-mentioned parameters exceed their respective boundary values or not.

However, in the above conventional air bag system, when the parameters are adjacent to these boundary values, for example, when the internal pressure of the air bag is adjusted in stages as low or high according to whether the weight of the occupant is less than 50 Kg or not, if the weight of the occupant is 49 Kg, then the occupant is restrained by the air bag expanded with a low level of internal pressure; and, if the weight of the occupant is 50 Kg, then the occupant is restrained by the air bag expanded with a high level of internal pressure. In this case, in spite of the fact that the weight difference is only 1 Kg, the occupant of 49 Kg is restrained with the low level air bag internal pressure. That is, in the conventional air bag system, there is still left room for improvement in restraining the occupant with the air bag properly.

SUMMARY OF THE INVENTION

The present invention aims at eliminating the drawbacks found in the above-mentioned conventional air bag system. Accordingly, it is an object of the invention to provide an air bag system which does not classify the sitting position and weight of the occupant as well as the degree of the collision but adjusts the internal pressure of the air bag in accordance with an increase or a decrease in the values of these parameters to thereby be able to expand the air bag properly.

In particular, an air bag system according to the invention comprises: (1) an air bag including a vent hole, (2) a gas generation device which generates gas for expansion to thereby expand an air bag, (3) a distance sensor for measuring a distance from the air bag to the head and bosom portion of an occupant, (4) a weight sensor for measuring the weight of the occupant, (5) an acceleration sensor for measuring the acceleration of a vehicle, and (6) a control device for controlling the internal pressure of the air bag when it is to be expanded, wherein (A) the protrusion distance of the air bag when the expansion thereof is completed, (B) a contact area between the expanded air bag and occupant, and (C) a buffer distance for which the expanded air bag is compressed when it is contacted with the occupant are previously input into the control device as constant values, and further (D) the acceleration function of the occupant according to the degree of a vehicle collision is also previously input into the control device, and also wherein the control device calculates a proper value of the air bag internal pressure according to a speed/distance/power balancing condition equation based on the behavior of the air bag and occupant in the vehicle collision, using the acceleration of the occupant calculated from the (D) acceleration function based on a signal from the acceleration sensor, a distance from the air bag before it is expanded to the head and bosom portion of the occupant based on a signal from the distance sensor, the weight of the head and bosom portion of the occupant based on a signal from the weight sensor, and the (A) to (C) constant values previously input into the control device.

In the air bag system according to the invention, the control device, using the acceleration of the occupant taken out from the previously input data based on the signal from the acceleration sensor, the distance from the air bag before it is expanded to the head and bosom portion of the occupant based on the signal from the distance sensor, the weight of the head and bosom portion of the occupant based on the signal from the weight sensor, and the previously input constant value of the air bag protrusion distance, contact area and buffer distance, calculates the proper air bag internal pressure value according to the above-mentioned speed/distance/power balancing condition equation based on the behavior of the air bag and occupant in the vehicle collision, and controls the gas generation device such that the gas generation device can generate a generated gas pressure corresponding to the thus calculated internal pressure value.

That is, in the air bag system according to the invention, unlike the conventional air bag system in which the sitting position and weight of the occupant or the degree of the shock are classified in stages according to the boundary values to thereby adjust the internal pressure of the air bag according to such classification, in order to be able to keep constant a buffer distance for which the air bag is compressed when it restrains the head and bosom portion of the occupant, the increased or decreased values of the sitting position and weight of the occupant or the degree of the collision shock are substituted into the above-mentioned given balancing condition equation to thereby calculate a proper value of the internal pressure of the air bag, and the gas generation device is controlled according to the thus calculated internal pressure value. That is, the sitting position and weight of the occupant as well as the degree of the collision shock are not classified in stages but, according to the increase or decrease of these values, the air bag internal pressure can be adjusted properly and thus the air bag can be expanded properly.

Also, according to the air bag system of the invention, regardless of an increase or a decrease in the sitting position and weight of the occupant or in the degree of the collision shock; the buffer distance for which the air bag is compressed when the air bag restrains the head and bosom portion of the occupant can be kept constant and, therefore, if the buffer distance is set for the maximum value of the air bag used, then the air bag expanded is able to restrain the occupant over the longest distance in the then condition whether the sitting position and weight of the occupant or the degree of the collision shock increase or decrease, so that a reaction given from the air bag and acting on the occupant can be restricted as much as possible in the then condition.

DETAILED DESCRIPTION OF THE PREFERRED EMBODIMENTS

Now, description will be given below of a first embodiment of an air bag system according to the invention with reference to the accompanying drawings.

Figure 1:
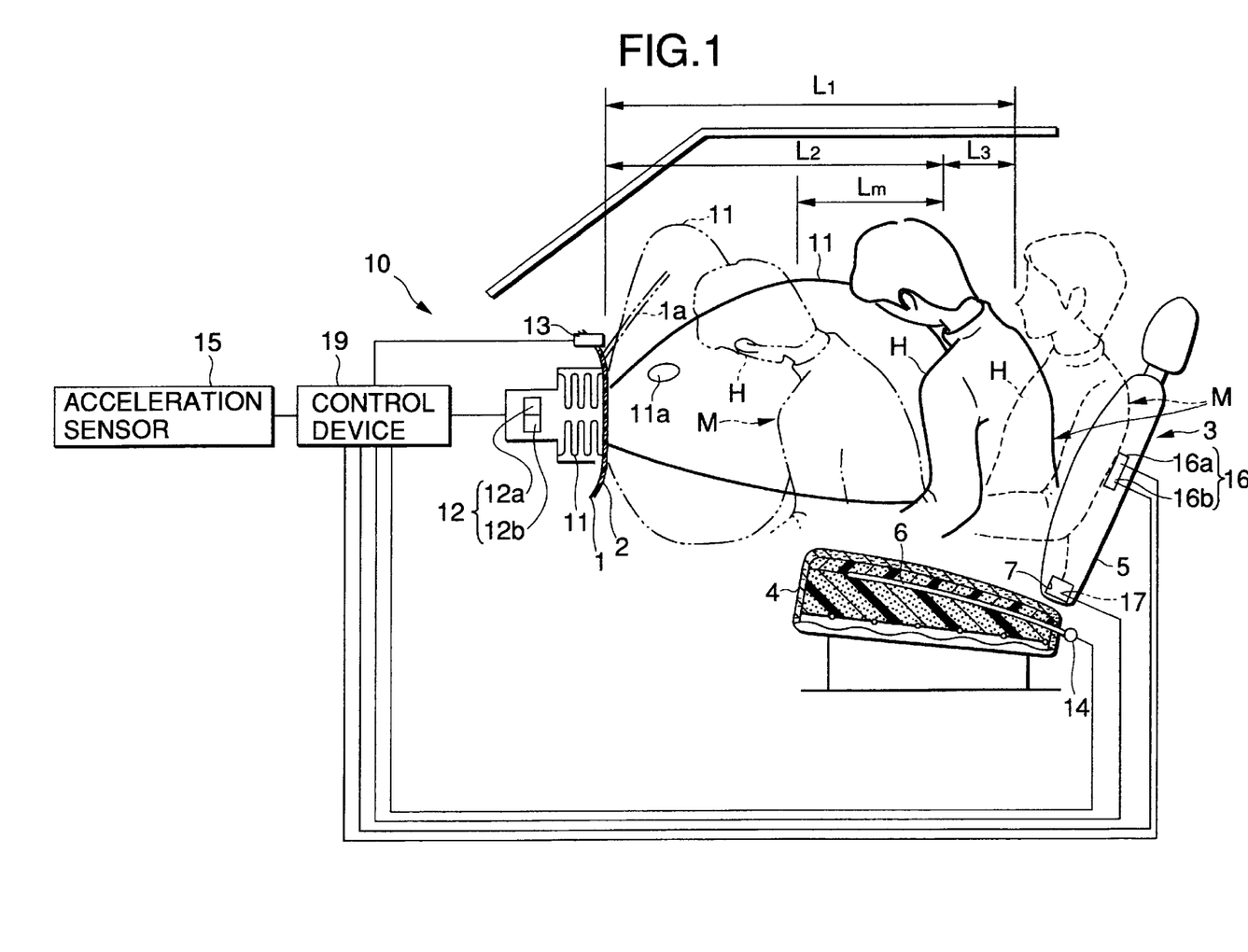
FIG. 1 is a schematic view of a first embodiment of an air bag system according to the invention.

An air bag system 10 according to the first embodiment of the invention, as shown in FIG. 1, comprises an air bag 11, a gas generation device 12, a distance sensor 13, a weight sensor 14, an acceleration sensor 15, and a control device 19.

The air bag 11, which is formed in a bag shape, is stored in the instrumental panel of a passenger's seat of a vehicle in such a manner that it is folded. And, the air bag 11 includes a vent hole 11a which allows expansion gas to escape into the open air so that, when the air bag 11 is expanded, the internal pressure of the air bag 11 can be kept constant until the air bag 11 is contacted with an occupant M and is thereby compressed.

Also, the instrumental panel 1 includes a cover 1a which can be opened and, when the air bag 11 is expanded, the cover 1a is pushed open by the expanding air bag 11, thereby causing the air bag 11 to project toward the occupant M.

Figure 2:
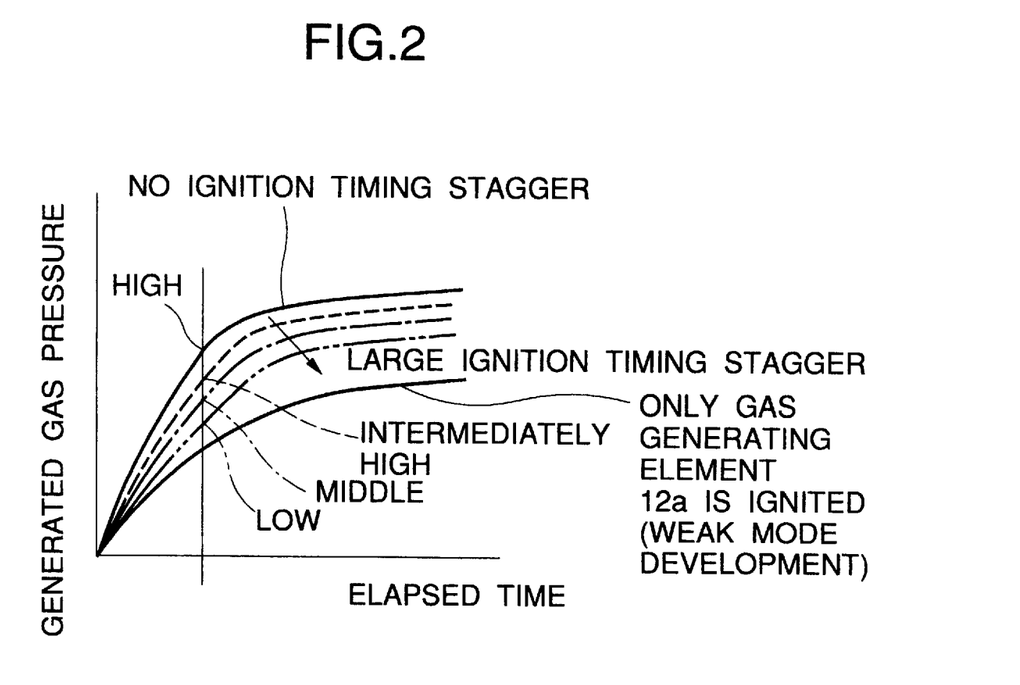
FIG. 2 is a graphical representation, explaining the conditions of the generated gas pressures of a gas generation device to be ignited in the first embodiment.

The gas generation device 12 comprises two gas generating elements 12a and 12b which respectively generate expansion gas when gas generating agents are set on fire due to the ignition of an igniter device: in particular, the gas generation device 12 is structured such that it can increase the pressure of the expansion gas to be supplied to the air bag 11 by approaching together the ignition timings of the two gas generating elements 12a and 12b; and, on the other hand, by staggering the above ignition timings greatly from each other, it can lower the pressure of the expansion gas to be supplied to the air bag 11. That is, as shown in FIG. 2, if the ignition timings of the two gas generating elements 12a and 12b are staggered in the unit of $\frac{1}{1000}$ sec., then the pressure of the generated expansion gas becomes lower accordingly and, during this staggering operation, if the expansion of the air bag 11 is completed to thereby cause the occupant M to be contacted with the air bag 11, then the internal pressure of the air bag 11 can be adjusted. By the way, even when the ignition timings are staggered, if the two gas generating elements 12a and 12b are ignited, then, finally, as shown in FIG. 2, the pressure of the generated expansion gas of the gas generation device 12 itself approaches a constant value; but, because there is formed in the air bag 11 the vent hole 11a for causing the expansion gas to escape to the open air so that the internal pressure of the air bag 11 can be kept constant, the adjustment of the internal pressure of the air bag 11 after completion of the gas expansion can be achieved by adjusting the ignition timings of the two gas generating elements 12a and 12b.

And, the distance sensor 13 is disposed at a given position of the instrumental panel 1 and is used to measure a distance $L_1$ from the air bag 11 stored in the instrumental panel 1 to the head and bosom portion H of the occupant M. The distance sensor 13 is constituted by well-known optical sensor and ultrasonic sensor respectively using light and ultrasonic waves, an infrared sensor using infrared rays, and the like.

The weight sensor 14 includes a pressure sensor and is disposed in a bag body 6 which is embedded in a seat portion 4 of a seat 3, in which the occupant M is to be seated, and is sealed with air. And, due to an increase in the internal pressure of the bag body 6 when the occupant M sits on the seat portion 4, the weight sensor 14 measures the weight of the occupant M.

The acceleration sensor 15 is disposed in the front portion of a vehicle or the like and includes an acceleration meter of a well-known distortion gauge type, a piezo-gauge type, or the like.

The control device 19, which comprises a microcomputer and the like, is disposed at a given position in the vehicle and is also connected electrically to the gas generation device 12, distance sensor 13, weight sensor 14 and acceleration sensor 15. And, on inputting therein signals from the distance sensor 13, weight sensor 14 and acceleration sensor 15, the control device 19 operates them and controls the operation of the gas generating elements 12a and 12b of the gas generation device 12.

Also, the control device 19 is structured such that it can input therein signals from a child seat confirmation sensor 16, which is used to detect whether a child seat is disposed or not, and from a seat belt confirmation sensor 17 which is used to detect whether a seat belt is mounted or not. The sensor 16 includes two lead switches 16a and 16b disposed, for example, in a back portion 5 of the seat 3 and, on sensing one of the magnetic forces of two magnets separately provided on the front and rear sides of the child seat, a corresponding one of the lead switches 16a and 16b is turned on to thereby be able to detect whether the child seat is mounted in a forwardly facing position (that is, a child is to be seated forwardly) or in a backwardly facing position (a child is to be seated backwardly). On the other hand, sensor 17 comprises, for example, a photoelectric switch disposed in a buckle 7 and, if the light is cut off within the buckle 7 when the metal fittings of the seat belt are mounted into the buckle 7, then the sensor 17 is able to detect that the seat belt is mounted.

Further, in the memory of the control device 19, previously, there are recorded the followings: that is, the acceleration function data of the occupant in a vehicle collision corresponding to the elapsed time from the time of collision ($t_0$) to a time ($t_2$) exceeding the boundary value ($a_s$) of the acceleration that requires the restraint of the occupant; the protrusion distance ($L_2$) of the air bag 11 after the expansion thereof is completed; a contact area (S) between the air bag 11 expanded and the occupant M; a buffer distance ($L_m$) for which the expanded air bag 11 is compressed when it is contacted with the occupant M; and, time data necessary for expansion when the expansion of the air bag 11 is completed with various internal pressures.

Figure 3:
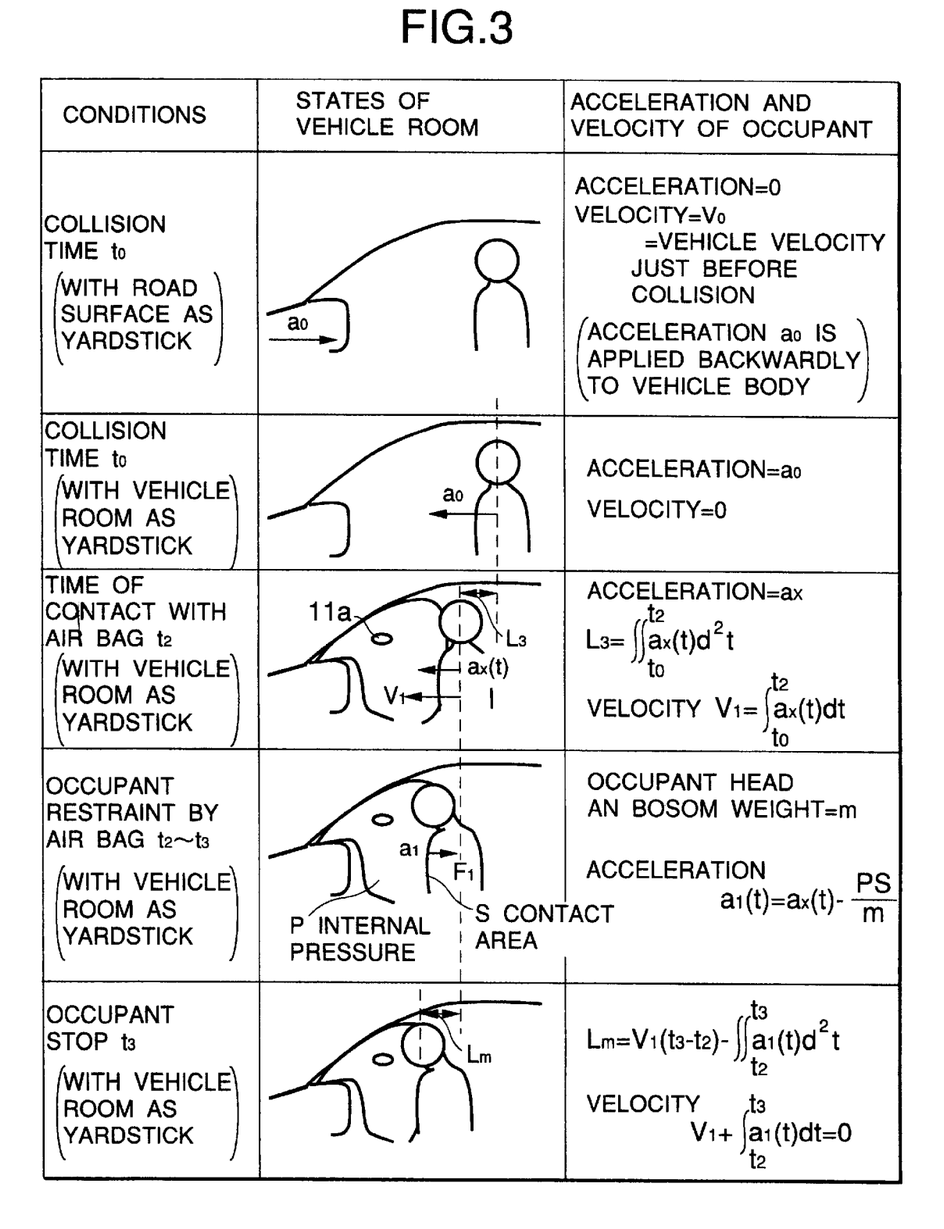
FIG. 3 is an explanatory view of the control concept of the first embodiment.

Now, description will be given below of the basic concept of the control operation to be executed by the present control device 19 (see FIG. 3):

At first, if a vehicle running at a constant velocity is collided head-on, then the vehicle is suddenly decelerated so that there is generated a backward acceleration $a_0$ in the vehicle. At the collision time ($t_0$), when the road surface is used as a yardstick, the occupant M not restrained is still moving at the constant velocity. However, with the room of the vehicle used as a yardstick, an apparent acceleration $a_0$ is generated forwardly in the occupant M and thus, from this moment, the occupant M starts to move forwardly in the vehicle room while increasing his or her velocity.

And, at the time ($t_1$) when the acceleration $a_0$ exceeds the previously set boundary value $a_s$ of the acceleration requiring the restraint of the occupant, the gas generation device 12 is ignited (in the present embodiment, actually, at the time ($t_1$) when the acceleration $a_0$ exceeds the boundary value $a_s$ of the acceleration, the control device 19 performs a predetermined operation to determine the proper internal pressure value of the air bag 11 and the gas generation device 12 is ignited in accordance with the thus determined air bag internal pressure value. In this case, however, since the operation by the control device 19 is executed in an instant when compared with the behavior of the occupant M, the expansion of the air bag 11 and the like, there can be provided a similar condition to the case in which the gas generation device 12 is ignited at the time ($t_1$) when the acceleration $a_0$ exceeds the boundary value $a_s$ of the acceleration).

After then, the air bag 11 completes its expansion and, at a given time ($t_2$), the occupant M is contacted with the air bag 11. At the time ($t_2$), the acceleration $a_0$ is coming to an end, whereas a new acceleration $a_1$ due to the reaction $F_1$ of the air bag 11 is applied to the occupant M. And, the occupant M, while losing his or her moving velocity gradually, advances by a buffer distance $L_m$ and stops there. Unless the air bag 11 reaches its bottom (that is, unless the air bag 11 exhausts the expansion gas to be thereby compressed and thus the occupant M is caused to touch peripheral equipment), the longer the buffer distance $L_m$ is, the smaller shock is given to the occupant and, for this reason, the buffer distance $L_m$ may preferably be set as longest as possible regardless of the kinetic energy of the occupant M.

Therefore, the buffer distance $L_m$ may be previously set according to the bag shape of the air bag 11, and the internal pressure value of the air bag 11 may be adjusted in such a manner that the occupant M can be made to stop at the position of the buffer distance $L_m$.

Also, since the air bag 11 includes the vent hole 11a which is capable of exhausting the expansion gas, the air bag 11 in contact with the occupant M is compressed in a condition that it keeps constantly the internal pressure thereof obtained at the time of completion of the expansion while exhausting the excess amount of the expansion gas from the vent hole 11a. Due to this, the pressure of the generated gas, which is obtained when the ignition timings of the gas generation device 12 are adjusted, provides the internal pressure of the air bag 11 which is maintained until the occupant M is made to stop.

And, when calculating the internal pressure value of the air bag 11, the operating conditions of the gas generation device 12 must be decided at the time $t_1$ when the gas generation device 12 is operated, that is, at the time $t_1$ when the acceleration $a_0$ measured by the acceleration sensor 15 exceeds the boundary value $a_s$, while the forward acceleration $a_X$ of the occupant during the time $t_1 \sim t_3$ must be estimated.

Figure 4:
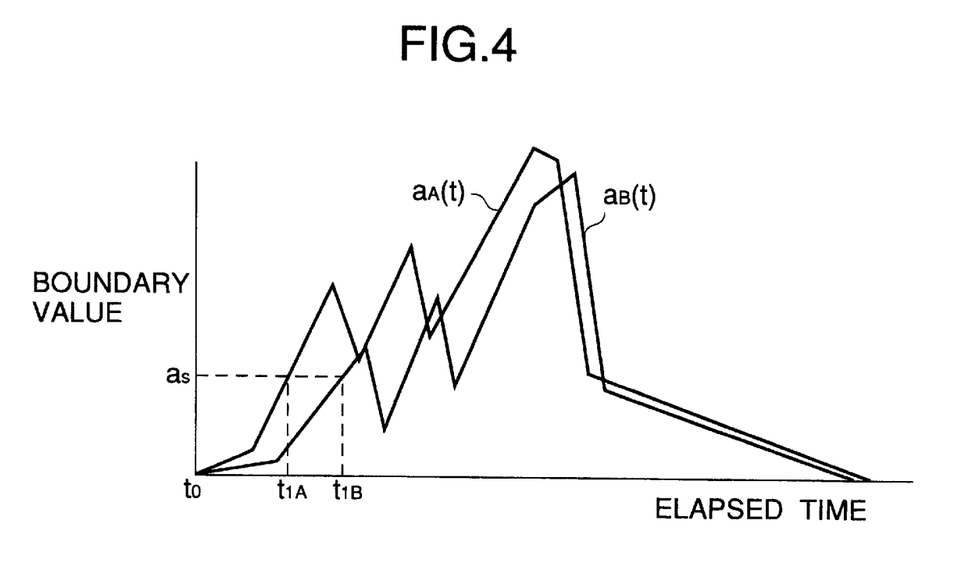
FIG. 4 is a graphical representation, showing the function data on acceleration to be used when the above embodiment is controlled.

However, due to the fact that the front frame and the like of the vehicle in collision are deformed while absorbing shock energy, the acceleration $a_0$ provides a function which varies with time and, in fact, the acceleration $a_0$ can be expressed by $a_X$ (t). And, the acceleration $a_X$ (t) expressed as the time function varies from vehicle to vehicle and also in every running velocity. Therefore, as shown in FIG. 4, it is necessary to prepare a large pieces of acceleration function data obtained by conducting an actual vehicle collision test in which a vehicle carrying thereon the air bag system 10 is made to collide at various running velocities, or by conducting a collision test through simulation. By the way, $a_A$ (t) expresses an acceleration when the vehicle is made to collide head-on at a fast running velocity, while $a_B$ (t) expresses an acceleration when the vehicle is made to collide head-on at a slow running velocity. And, according to the elapsed time from $t_0$ to the time $t_1$ when the acceleration value $a_0$ based on a signal from the acceleration sensor 15 exceeds the boundary value $a_s$, if the elapsed time is short, then the degree of the collision is large and thus there is employed the function data of a given line graph on the acceleration $a_A$ (t) side; and, if the elapsed time is long, then the degree of the collision is small and thus there is employed the function data of a given line graph on the acceleration $a_B$ (t) side. These function data on the acceleration $a_X$ (t) can be applied similarly to an actual vehicle, provided the vehicle is of the same type and, therefore, may be previously recorded in large number in the memory of the control device 19.

Figure 5:
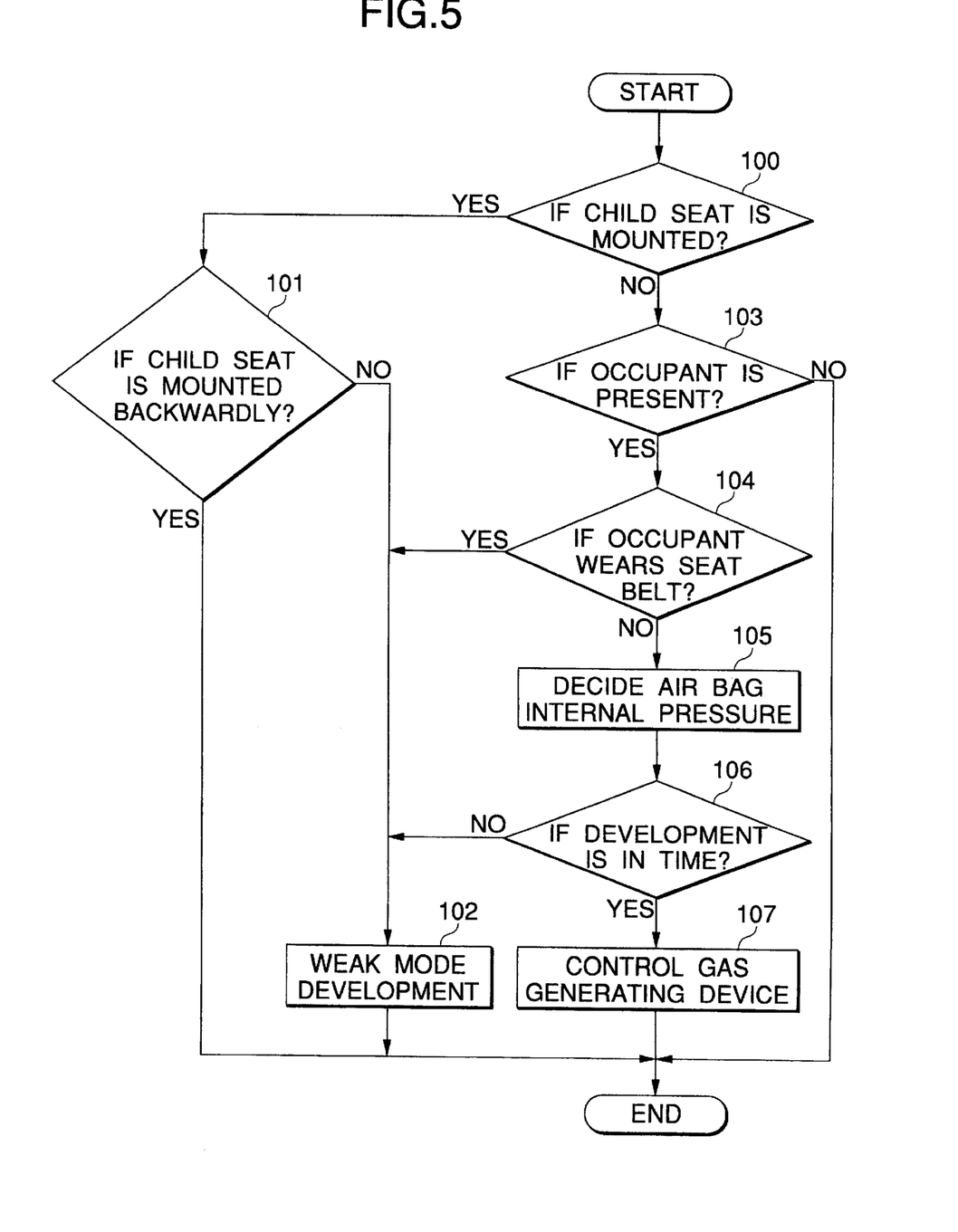
FIG. 5 is a flow chart of the control of the first embodiment.

And, referring to the operation of the air bag system 10 according to the present embodiment, at first, if a vehicle collides, then the control device 19 performs a computational processing on an electrical signal from the acceleration sensor 15 and, if the acceleration value $a_0$ exceeds the acceleration boundary value $a_s$ which requires the restraint of the occupant M, then detects the collision of the vehicle and controls the air bag system 10 in such a manner as shown in FIG. 5.

Firstly, in Step 100, it detects in accordance with presence or absence of a signal from the child seat confirmation sensor 16 whether the child seat is mounted or not and, if it is found that the child seat is mounted, then the processing advances to Step 101, whereas if not mounted, then the processing goes to Step 103.

In Step 101, it is judged from a signal from either of the lead switches 16a and 16b of the child seat confirmation sensor 16 whether the child seat is mounted in a forwardly facing manner or in a backwardly facing manner and, if it is found that the child seat is mounted in a forwardly facing manner, then the processing goes to Step 102 and the operation of the gas generation device 12 is controlled in such a manner that the air bag 11 can be developed in a weak mode. In this weak mode development, the control device 19 allows only the gas generating element 12a of the gas generation device 12 to be ignited, so that the air bag 11 is expanded by only the expansion gas from the gas generating element 12a. On the other hand, if it is found that the child seat is mounted in a backwardly facing manner, then, in order not to expand the air bag 11, the processing does not advance to Step 102 but the control of the control device 19 is terminated.

In Step 103, when the child seat is not mounted on the seat 3, it is judged from a signal from the weight sensor 14 whether the occupant is seated on the seat 3 or not and, if it is found that the occupant M is not seated on the seat 3, then the control of the control device 19 is terminated in order not to expand the air bag 11. On the other hand, if the occupant M is seated on the seat 3, then the processing goes to Step 104.

In Step 104, it is checked from a signal from the seat belt confirmation sensor 17 whether the occupant M wears the seat belt or not. If it is found that the occupant M wears the seat belt, then the processing goes to Step 102, where the operation of the gas generation device 12 is controlled in such a manner that the air bag 11 can be developed into the weak mode. On the other hand, if the occupant M does not wear the seat belt, then the processing advances to Step 105 in which the internal pressure of the air bag 11 is calculated.

And, in Step 105, at first, there is computed a time which has passed from the time to when the vehicle collided, that is, the contact time $t_2$ when the occupant M starts to touch the air bag 11 with the expansion thereof completed.

In this computation equation, according to the distance $L_1$ from the air bag 11 before expanded to the occupant head and bosom portion H based on the signal from the distance sensor 13, the occupant M acceleration $a_x$ (t) expressed as function data employed according to the elapsed time when the acceleration value $a_0$ measured based on the signal from the acceleration sensor 15 exceeds the acceleration boundary value $a_s$ from the collision time $t_0$, and the protrusion distance $L_2$ of the air bag 11 with the expansion thereof completed, there is firstly calculated a distance $L_3$ which is necessary for the occupant head and bosom portion H to touch the air bag 11 with the expansion thereof completed.

That is, $$L_3 = L_1 - L_2 \quad (1)$$

And, since the distance $L_3$ is equal to a value obtained when the acceleration $a_x$ (t) from the vehicle collision time $t_0$ to the contact time $t_2$ is integrated twice, there is obtained the following equation (2):

$$L3 = \int \int_{t0}^{t2} a_x(t) d^2t \quad (2)$$

Then, $t_2$ can be calculated from the above equations (1) and (2).

By the way, since $L_1$ is previously measured from the signal from the distance sensor 13 and $L_2$ is previously recorded in the memory of the control device 19 according to the bag shape of the air bag 11, these values may be substituted in the above equations. Further, the collision time $t_0$ is also previously recorded in the control device 19 which has input therein the signal from the acceleration sensor 15 and, therefore, the thus recorded value may be substituted in the above equations.

After the contact time $t_2$ is calculated, the advance velocity ($V_1$) of the occupant M into the air bag 11 is found from the contact time ($t_2$) and the occupant M acceleration (ax (t)) employed from the function data.

That is, the advance velocity ($V_1$) is a value obtained by integrating the occupant M acceleration (ax (t)) from the vehicle collision time $t_0$ to the contact time $t_2$, as shown below:

$$V_1 = \int_{t0}^{t2} a_x(t) dt \quad (3)$$

Accordingly, $V_1$ is calculated according to this equation (3).

Next, the weight m of the occupant M head and bosom portion H is calculated in accordance with a signal from the weight sensor 14. In particular, the weight of the occupant M can be measured in accordance with the signal from the weight sensor 14 and the approximately 30% of the occupant M weight is equal to the weight m of the occupant head and bosom portion H. Thus, in the present embodiment, the value of the weight of the occupant M is multiplied by 0.3 to thereby calculate the weight m of the occupant head and bosom portion H.

Also, because it can be assumed that the contact area (S) between the air bag 11 and occupant head and bosom portion H varies little among individuals even if they are respectively heavy or light in weight, in the present embodiment, it is set that S=0.13 m$^2$.

By the way, the numeric value used to multiply the weight value and the contact area S, which are respectively employed to calculate the weight m of the head and bosom portion H, can be changed properly according to cases.

Now, description will be given below of the relationship among the deceleration ($a_1$ (t)) of the air bag 11 acting on the occupant M, a stop time ($t_3$) when the occupant M stops at the buffer distance ($L_m$), and the internal pressure (P) of the air bag 11.

At first, the buffer distance ($L_m$) may be found in such a manner that a value (distance), which is obtained when the deceleration ($a_1$ (t)) causing generation of the reaction $F_1$ of the air bag 11 acting on the occupant M from the contact time $t_2$ to the stop time $t_3$ is integrated twice, is subtracted from the advanced distance of the occupant M from the contact time $t_2$ to the stop time $t_3$. This can be expressed by the following equation (4):

$$L_m = V_1(t_3 - t_2) - \int \int_{t2}^{t3} a_1(t) d^2t \quad (4)$$

Also, since the advance velocity ($V_1$) becomes zero from the contact time $t_2$ to the stop time $t_3$, the advance velocity ($V_1$) balances oppositely in direction with the integrated value (velocity) of the deceleration $a_1$ (t) which causes generation of the reaction $F_1$ of the air bag 11 acting on the occupant M. This can be expressed in the following equation (5):

$$\text{That is, } V1 + \int_{t2}^{t3} a_1(t) dt = 0 \quad (5)$$

Further, referring to a power balancing condition equation from the contact time $t_2$ to the stop time $t_3$, since the occupant M having the weight m of the head and bosom portion H thereof moves at the acceleration ax (t) and receives the internal pressure P of the air bag 11 in the contact area S in the opposite direction to the moving direction thereof, while the air bag 11 applies the oppositely-going deceleration $a_1$ (t) to the occupant M having the weight m, the power balancing condition equation can be expressed by the following equation:

$$ma_x(t) - PS = ma_1(t)$$

That is, it can be expressed by the following equation:

$$a_1(t)=a_X(t)-PS/m \text{(where, } t_2 \leq t \leq t_3\text{)} \quad (6)$$

And, while the deceleration ($a_1$ (t)) of the air bag 11 acting on the occupant M, the stop time ($t_3$) when the occupant M stops at the buffer distance ($L_m$), and the internal pressure (P) of the air bag 11 are unknowns, simultaneous equations consisting of the velocity/distance/power balancing condition equations (4)–(6) based on the air bag 11 and occupant M in the collision time are operated to thereby calculate the internal pressure value (P) of the air bag 11.

After the internal pressure value (P) of the air bag 11 is calculated, the processing goes to Step 106. In Step 106, when the occupant M is seated in the extremely front portion of the seat, it is necessary to prevent the occupant M from touching the air bag 11 being expanded and, therefore, the following condition equation (7) is operated.

That is, whether the condition of $$t_2 \leq t_1 + \Delta t_b \quad (7)$$

is satisfied or not is operated. Here, $t_2$ is the contact time between the air bag 11 and the occupant head and bosom portion H and is already calculated in Step 105, while $t_1$ is the time when the acceleration value $a_0$ previously measured in accordance with the signal from the acceleration sensor 15 exceeds the boundary value $a_s$, and it is also previously known. Also, $\Delta t_b$ is a time necessary until the expansion of the air bag 11 is completed. In particular, since the time data obtained when the expansion of the air bag 11 is completed with various internal pressures are previously recorded in the memory of the control device 19, in accordance with the internal pressure value (P) calculated in Step 105, the time necessary for expansion with this internal pressure is taken out from the memory and the thus taken-out time value is then applied as $\Delta t_b$.

If the condition equation of the equation (7) is satisfied, then the occupant M is to touch the air bag 11 being expanded and, in order to prevent such touch, the processing goes to the weak mode development of Step 102. On the other hand, if the condition equation of the equation (7) is not satisfied, then the occupant M is to touch the air bag 11 with the expansion thereof completed and thus the expansion development of the air bag 11 is in time for touch with the occupant M, so that the processing goes to Step 107.

In Step 107, while the mutual ignition timings of the gas generating elements 12a and 12b of the gas generation device 12 are being adjusted in such a manner that the internal pressure of the air bag 11 can provide the internal pressure value P of the air bag 11 calculated in Step 105, the gas generating elements 12a and 12b are ignited, thereby terminating the control of the control device.

And, if the gas generation device 12 is ignited, then the air bag 11 opens the cover 1a due to the expansion gas discharged from the gas generation device 12 and expands until it turns into its expansion completed shape. After then, the air bag 11 receives the head and bosom portion H of the occupant M and is thus compressed by an amount corresponding to the buffer distance $L_m$ while exhausting the expansion gas from the vent hole 11a, thereby stopping the movement of the occupant M.

In the air bag system 10 according to the present embodiment, as has been described heretofore, unlike the conventional air bag system in which the sitting position and weight of the occupant or the degree of the shock are classified in stages according to the boundary values to thereby adjust the internal pressure of the air bag 11, in order to be able to keep constant the buffer distance $L_m$ of the air bag 11 for which the air bag 11 is compressed when it restrains the head and bosom portion H of the occupant, the increased or decreased values of the sitting position and weight of the occupant or the degree of the shock are substituted into a given balancing condition equation to thereby calculate the internal pressure value P of the air bag 11, and the gas generation device 12 is controlled according to the thus calculated internal pressure value P. That is, the sitting position and weight of the occupant as well as the degree of the shock are not classified in stages but, according to the increase or decrease of these values, the air bag internal pressure can be adjusted properly and thus the air bag 11 can be expanded properly.

Also, in the air bag system 10 according to the present embodiment, regardless of an increase or a decrease in the sitting position and weight of the occupant M or in the degree of the shock, the buffer distance $L_m$ of the air bag 11, for which it is compressed when the air bag restrains the head and bosom portion H of the occupant M, can be kept constant and, therefore, if the buffer distance $L_m$ is set for the maximum value of the air bag 11 used, then even if the sitting position and weight of the occupant M or the degree of the shock increase or decrease, the air bag 11 expanded is able to restrain the occupant M over the longest distance in the then condition, so that the reaction $F_1$ given from the air bag 11 and acting on the occupant M can be restricted as much as possible in the then condition.

Figure 6:
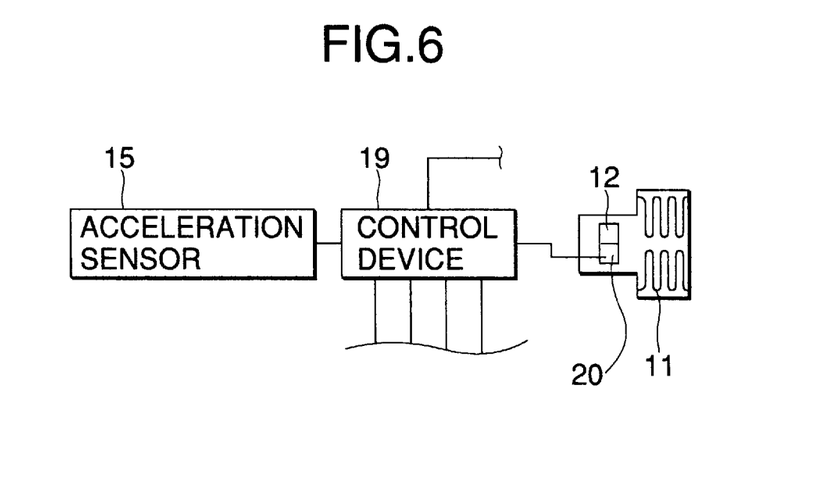
FIG. 6 is a schematic view of a second embodiment of an air bag system according to the invention, in which there is provided a flow rate control valve in a gas generation device and the generated gas pressure of the gas generation device can be adjusted by the flow rate control valve.

By the way, in the illustrated embodiment, the adjustment of the generated gas pressure of the gas generation device 12 is achieved by means of the ignition timing adjustment of the two gas generating elements 12a and 12b. However, alternatively, as shown in FIG. 6, a single gas generating element (device) may be used, in the flow path of the expansion gas to the air bag 11, there may be disposed an electromagnetic type of flow rate control valve 20 which is capable of releasing the expansion gas into the open air in such a manner that the release amount of the expansion gas into the open air can be adjusted, and the control device 19 may be structured such that it can control the flow rate control valve. Here, in FIG. 6, the parts used in common with those in FIG. 1 are omitted.

Figure 7:
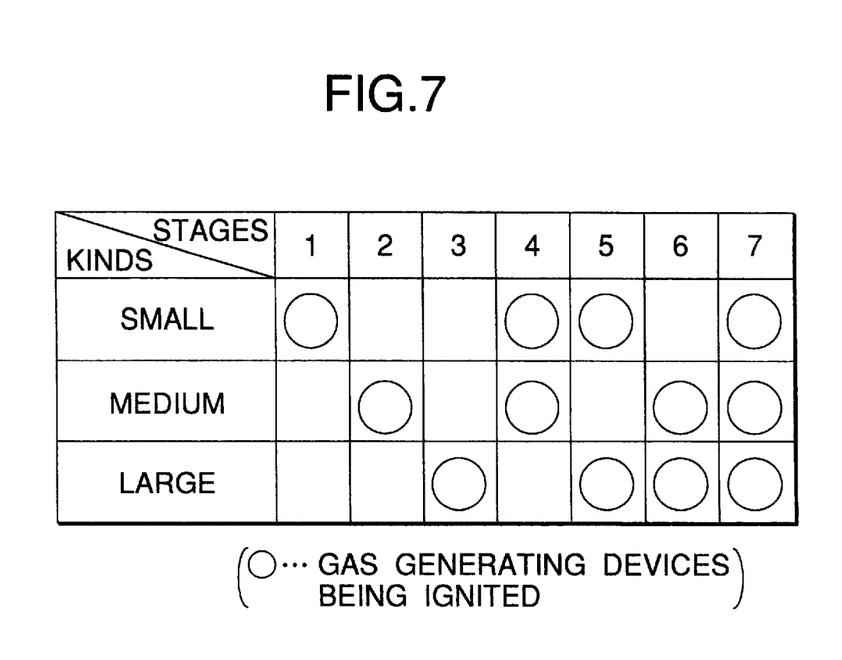
FIG. 7 is an explanatory view of the conditions of the generated gas pressures of a gas generation device to be ignited in the second embodiment.

Further, to obtain the generated gas pressure in the ignition time, there may be prepared two or more kinds of gas generating elements (devices) such as small-sized, medium-sized, and large-sized gas generating elements, and they may be ignited at the same time individually or in proper combination thereof. For example, when the generated gas pressure is obtained by use of three kinds of, that is, small-sized, medium-sized, and large-sized gas generating elements, as shown in FIG. 7, there can be produced seven stages of generated gas pressure, while the control device 19 may control and ignite one or more given gas generating elements in such a manner that the generated gas pressure can be near to the calculated internal pressure P of the air bag 11.

By the way, when the generated gas pressure is adjusted by adjusting the ignition timing or by adjusting the flow rate of the flow rate control valve according to the illustrated embodiment, the generated gas pressure can be adjusted finely in an analog manner and, therefore, the internal pressure of the air bag 11 can also be adjusted finely in an analog manner, so that the occupant M can be restrained finely in an analog manner and continuously, that is, in the most suitable manner according to the sitting position and the weight of the occupant M or according to the increasing or decreasing value of the degree of the shock. Of course, when there are prepared two or more kinds of gas generating elements having different generated gas pressures in the ignition time, if the number of gas generating elements to be prepared is increased, then a similar effect to the above can be provided, while at least three pieces of gas generating elements may be prepared for this purpose.

In the illustrated embodiment, description has been given of a case in which the present air bag system is applied to the passenger's seat but, of course, the present invention can also be applied to a driver's seat.

What is claimed is:

1. An air bag system comprising:
   (1) an air bag including a vent hole;
   (2) a gas generation device for generating expansion gas to thereby be able to expand the air bag;
   (3) a distance sensor for measuring a distance from the air bag to a head and bosom portion of an occupant;
   (4) a weight sensor for measuring a weight of the occupant;
   (5) an acceleration sensor for measuring an acceleration of a vehicle; and
   (6) a control device for controlling an internal pressure of the air bag when it is expanded;
   wherein (A) the protrusion distance of said air bag with the expansion thereof completed, (B) a contact area between said expanded air bag and said occupant, and (C) a buffer distance for which said expanded air bag is compressed when it is contacted with said occupant, are previously input into said control device as constant values, and further (D) the acceleration function of said occupant according to the degree of a collision is also previously input into said control device, and also wherein said control device calculates a proper value of the internal pressure of said air bag according to a speed/distance/power balancing condition equation based on a behavior of said air bag and said occupant in a collision, using an acceleration of said occupant calculated from said (D) acceleration function based on a signal from said acceleration sensor, a distance from said air bag before it is expanded to the head and bosom portion of said occupant based on a signal from said distance sensor, a weight of said head and bosom portion of said occupant based on a signal from said weight sensor, and said (A) to (C) constant values previously input into said control device.

2. The air bag system as set forth in claim 1, wherein said gas generation device is prepared in the plural number, and said control device staggers the ignition timings of said respective gas generation devices from each other to thereby be able to control the internal pressure value of said air bag.

3. The air bag system as set forth in claim 1, wherein each of said gas generation devices includes an electromagnetic type of flow rate control valve for adjusting the release amount of said expansion gas, and said control device controls said flow rate control valve to thereby be able to control the internal pressure value of said air bag.

4. An air bag system as set forth in claim 1, wherein a plurality of said gas generation devices differing in the generated gas pressure from each other are prepared, and said control device controls the combination of said gas generation devices to be ignited to thereby be able to control the internal pressure of said air bag.

* * * * *